United States Patent
Chiu et al.

(10) Patent No.: US 9,645,660 B2
(45) Date of Patent: May 9, 2017

(54) TOUCH DISPLAY DEVICE

(71) Applicant: TPK TOUCH SOLUTIONS (XIAMEN) INC., Xiamen (CN)

(72) Inventors: Tsung-Ke Chiu, Tainan (TW); Manyu Yang, Quanzhou (CN); Sanyang Zhuang, Ningbo (CN); Tianfu Chen, Zhangping (CN); Jing Yu, Xiamen (CN)

(73) Assignee: TPK Touch Solutions (Xiamen) Inc, Xiamen (CN)

( * ) Notice: Subject to any disclaimer, the term of this patent is extended or adjusted under 35 U.S.C. 154(b) by 0 days.

(21) Appl. No.: 14/308,663

(22) Filed: Jun. 18, 2014

(65) Prior Publication Data

US 2016/0011704 A1    Jan. 14, 2016

(30) Foreign Application Priority Data

Jun. 18, 2013   (CN) .......................... 2013 1 0240817

(51) Int. Cl.
*G06F 3/041*   (2006.01)
*G06F 3/044*   (2006.01)
*G06F 1/16*    (2006.01)

(52) U.S. Cl.
CPC .......... *G06F 3/0412* (2013.01); *G06F 1/1643* (2013.01); *G06F 3/044* (2013.01); *G06F 2203/04107* (2013.01)

(58) Field of Classification Search
CPC .................... G06F 3/0412; G06F 2203/04107
USPC .......................................................... 349/12
See application file for complete search history.

(56) References Cited

U.S. PATENT DOCUMENTS

| | | | |
|---|---|---|---|
| 6,654,083 B1* | 11/2003 | Toda ................. | G02F 1/133308 349/110 |
| 2009/0257010 A1* | 10/2009 | Sakurai ............. | G02F 1/133308 349/110 |
| 2011/0242017 A1* | 10/2011 | Kang ..................... | G06F 3/045 345/173 |
| 2012/0026107 A1* | 2/2012 | Kim ........................ | G06F 3/044 345/173 |
| 2013/0044074 A1* | 2/2013 | Park ..................... | G02F 1/13338 345/174 |
| 2014/0204286 A1* | 7/2014 | Park ....................... | G06F 1/1626 349/12 |
| 2015/0103263 A1* | 4/2015 | Han ........................ | G06F 1/1643 349/12 |

* cited by examiner

*Primary Examiner* — David Tung
(74) *Attorney, Agent, or Firm* — Gokalp Bayramoglu; Paul Bendemire

(57) ABSTRACT

A touch display device has portions defining a display area, and a non-display area. The touch display device comprises a display module, a touch panel, and a shielding component. The display module defines at least one light leakage area. The display module generates at least one leaked light ray diverging from the light leakage area. The touch panel module faces the display module and includes a cover structure and a touch sensing structure. The cover structure includes a cover and a decorative layer. The touch sensing structure disposed between the cover structure and the display module. The shielding component disposed between the decorative layer and the display module such that the shielding component shields the traveling path of at least one leaked light ray. The touch display device can prevent light leakage via the positioning of the shielding component.

3 Claims, 8 Drawing Sheets

TOUCH DISPLAY DEVICE

BACKGROUND OF THE INVENTION

The present invention claims the priority of China Patent Application No. 201310240817.1 filed on Jun. 18, 2013, which is incorporated by reference in the present application in its entirety.

Field of the Invention

The instant disclosure relates to a touch control technology; in particular, to a touch display device.

Description of Related Art

Due to the recent trend of electronic devices, which integrates touch control panels with display panels, touch control panels become the input interface between users and electronic devices. As a result, space occupied by physical keyboards can be omitted, which renders the electronic devices lighter and thinner.

A touch display device typically includes a display module and a touch panel module. The touch panel module typically includes a cover, a decorative layer arranged around the periphery of the cover, and a sensing electrode layer. Typically, the sensing electrode layer is disposed between the cover and the display module.

In actual products, light leakage problem is often present in display modules due to imprecise packaging which leads to distribution of spot or line shaped light leakage. When the display modules are applied to the touch display devices, the decorative layer can block portions of the light leakages. However, since a substantial distance is present between the decorative layer and the display module, light still leaks and diverges in which user can still easily notice and the outer appearance of the touch display module will be affected.

To address the above issues, the inventor strives via associated experience and research to present the instant disclosure, which can effectively improve the limitation described above.

BRIEF SUMMARY OF THE INVENTION

The object of the embodiments in the instant disclosure is to provide a touch display device which prevents light leakage.

A touch display device has a display area, and a non-display area. The touch display device comprises a display module, a touch panel module, and a shielding component. The display module has at least one light leakage area defined in the non-display area. The display module generates at least one leaked light ray diverging from the light leakage area. The touch panel module faces the display module and includes a cover structure and a touch sensing structure. The cover structure includes a cover and a decorative layer. The decorative layer is arranged at peripheral portions of the cover defining the non-display area. The touch sensing structure disposed between the cover structure and the display module. The shielding component is disposed between the decorative layer and the display module such that the shielding component shields the traveling path of at least one leaked light ray.

By adopting the touch display device in accordance with the embodiments of the instant disclosure, and disposing the shielding component in-between the decorative layer and the display module while proximate to the display module, the touch display device can prevent the problem of light leakages.

In order to further understand the instant disclosure, the following embodiments and illustrations are provided. However, the detailed description and drawings are merely used to illustrate the disclosure, rather than limiting the scope being defined by the appended claims and equivalents thereof.

DETAILED DESCRIPTION OF THE PREFERRED EMBODIMENTS

The content disclosed hereafter may use different or repeated component symbols in various embodiments, but bear no associations between components in various embodiments or drawings. Moreover, configuration description between components such as "on top, above, below, or beneath" may apply to the components which are in direct contact with each other in one embodiment, while the terms may also apply to additional components disposed between the components in another embodiment. Various components may be shown in various proportions in drawings to clarify the components or icons.

Figure 1:
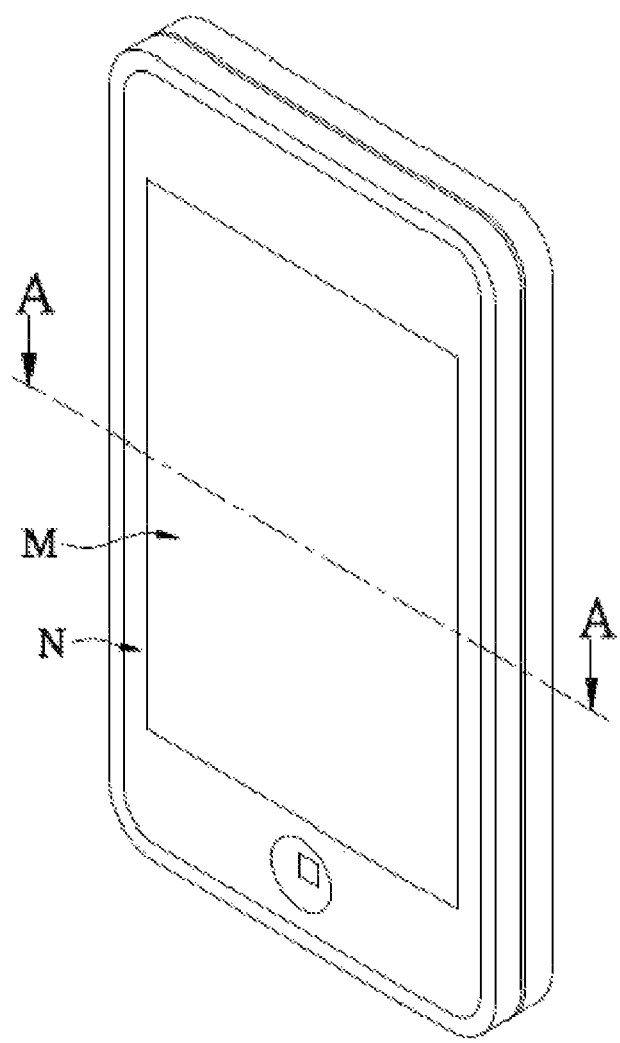
FIG. 1 is a perspective view illustrating the appearance of the touch display device in accordance with the instant disclosure.
Figure 2:
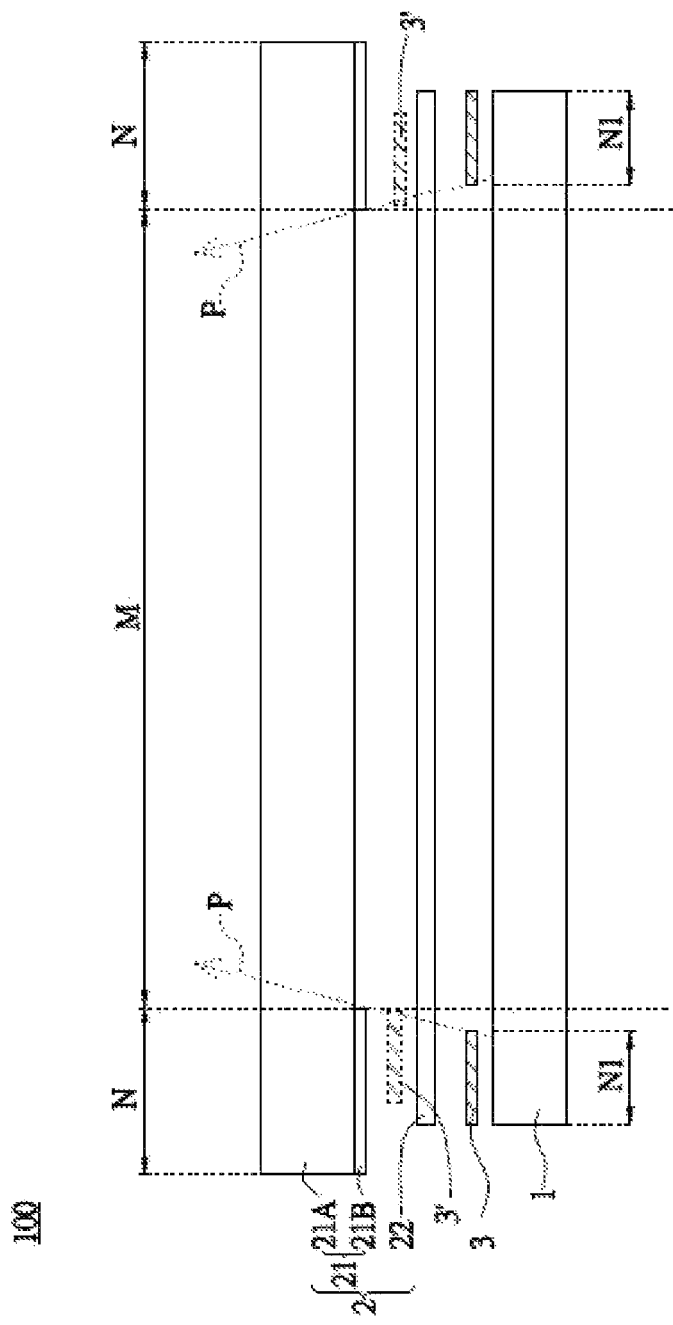
FIG. 2 is a cross-sectional view sectioned along the A-A line illustrating parts of components of the touch display device in accordance with the instant disclosure.

Please refer to FIGS. 1 and 2. FIG. 1 is a perspective view illustrating the appearance of the touch display device in accordance with the instant disclosure. FIG. 2 is a cross-sectional view sectioned along the A-A line illustrating parts of components of the touch display device in accordance with the instant disclosure.

As shown in FIG. 1, the touch display device 100 of the instant disclosure has a display area M, and a non-display area N arranged adjacent to the display area M. In FIG. 2, the touch display device 100 includes a display module 1, a touch panel module 2, and a shielding component 3. The display module 1 has at least one light leakage area N1 defined in the non-display area N. The display module generates at least one leaked light ray P diverging from the light leakage area N1. The touch panel module 2 faces the display module 1. The touch panel module 2 includes a cover structure 21 and a touch sensing structure 22. The cover structure 21 includes a cover 21A and a decorative layer 21B. The decorative layer 21B is arranged on the peripheral portions of the cover 21A and defines the non-display area N. The touch sensing structure 22 is disposed between the cover structure 21 and the display module 1.

The shielding component 3 is disposed between the decorative layer 21B and the display module 1 such that the shielding component 3 shields the traveling path of at least one leaked light ray P.

The display module 1 can be liquid crystal display (LCD), but can also be other types of display devices. As shown in FIG. 2, the leaked light ray P of the instant disclosure represents at least one light ray which diverges from the light leakage area N1 of the display module 1 during the operation of the touch display device 100.

A surface of the cover 21A (which is a surface of the cover 21A oppositely arranged from a surface of the decorative layer 21B) is an interface surface for interactions with fingers or styli. The surface of the cover 21A can be formed with special coatings thereon such as an anti-reflective layer, a stain resistant layer, or a combination thereof. The cover 21A is made of transparent material such as glass, acrylic (PMMA), polyvinyl chloride (PVC), polypropylene (PP), polyethylene terephthalate (PET), polyethylene naphthalate (PEN), polycarbonate (PC), polystyrene (PS), or similar types of transparent materials via chemical strengthening processes. Moreover, the cover 21A can be hard or flexible materials. The cover 21A may adapt two flat surfaces, two curved surfaces, or one flat and one curved surface. For example the cover 21A may resemble 2.5 D or 3D shape. However, the choice of the cover 21A is not limited to the examples provided herein.

The decorative layer 21B is made of opaque materials such as inks directly printed on the cover 21A, or photoresist materials etched on the cover 21A with photolithography.

Figure 3:
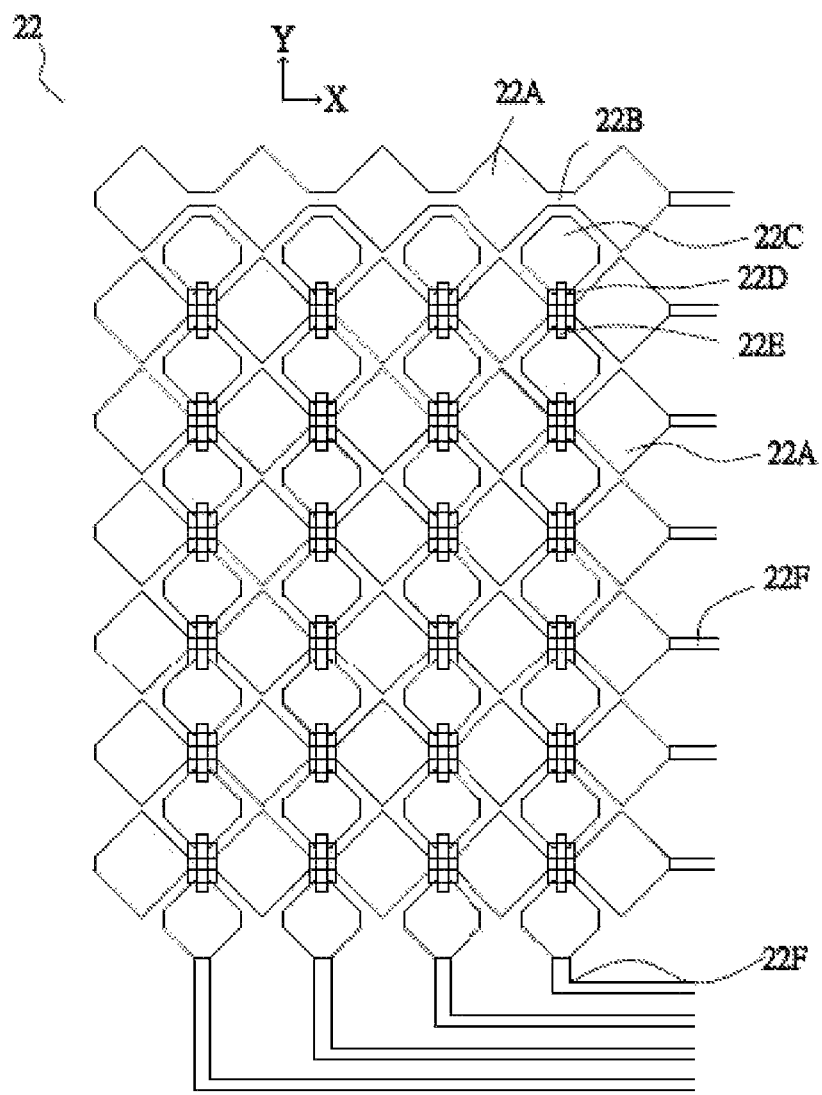
FIG. 3 is a schematic diagram of the touch display device in accordance with an embodiment of the instant disclosure.

Touch sensing structure 22 can be any of the common touch sensing structures. Please refer to FIG. 3 as a schematic diagram of the touch display device in accordance with an embodiment of the instant disclosure. In the embodiment, the touch sensing structure 22 includes a first electrode unit 22A, conductive line 22B, a second electrode unit 22C, an insulating member 22D, a jumper line 22E, and a signal transmission line 22F. The conductive line 22B is electrically connected between the first electrode units 22A configured along the X-axis direction to form a row of electrodes in series. The jumper line 22E is electrically connected between the second electrode units 22C configured along the Y-axis direction to form a column of electrodes in series. The insulating member 22D is disposed between the conductive line 22B and the jumper line 22E such that the row of electrodes and the column of electrodes are mutually and electrically insulated from each other. The signal transmission line 22F is electrically connected to the row and the column of electrodes to transmit touch control signals to an external signal processing device (not shown in figures).

The first electrode unit 22A, conductive line 22B, and the second electrode unit 22C can be configured in the same plane and integrally formed using the same material. Materials for example can be indium tin oxide, silver nanowire, carbon nanotubes or similar types of transparent conductive materials via process such as the lithography etching process. The insulating member 22D can be made of materials such as polyimide, epoxy resins, or similar types of insulating materials. The jumper lines 22E can be made of materials such as molybdenum, aluminum, indium tin oxide or similar types of conductive materials. The signal transmission line 22E and the jumper line 22F can use the same or different conductive materials.

The touch sensing structure 22 can use other types of structure and may further include controller and other components. The specific structure of the touch sensing structure 22 is not further disclosed.

The positioning and the quantity of the shielding component 3 can be adjusted according to the positioning and the quantity of the light leakage area N1 of the display module 1. As shown in FIG. 2, since the shielding component 3 (3') is only configured in the non-display area N to shield the travel paths of the leaked light rays P, the size of the display area M of the touch display device 100 is not limited, whereas the leaked light rays P which leak through the light leakage area N1 and the decorative layer 21B are blocked. The smaller the distance between the shielding component 3 and the light leakage area N1, the more leaked light rays are blocked. The shielding component 3 can be disposed on the decorative layer 21B, the touch sensing structure 22, or the display module 1.

The following description discloses the various configurations of the instant embodiment in accordance with the instant disclosure.

Figure 4A:
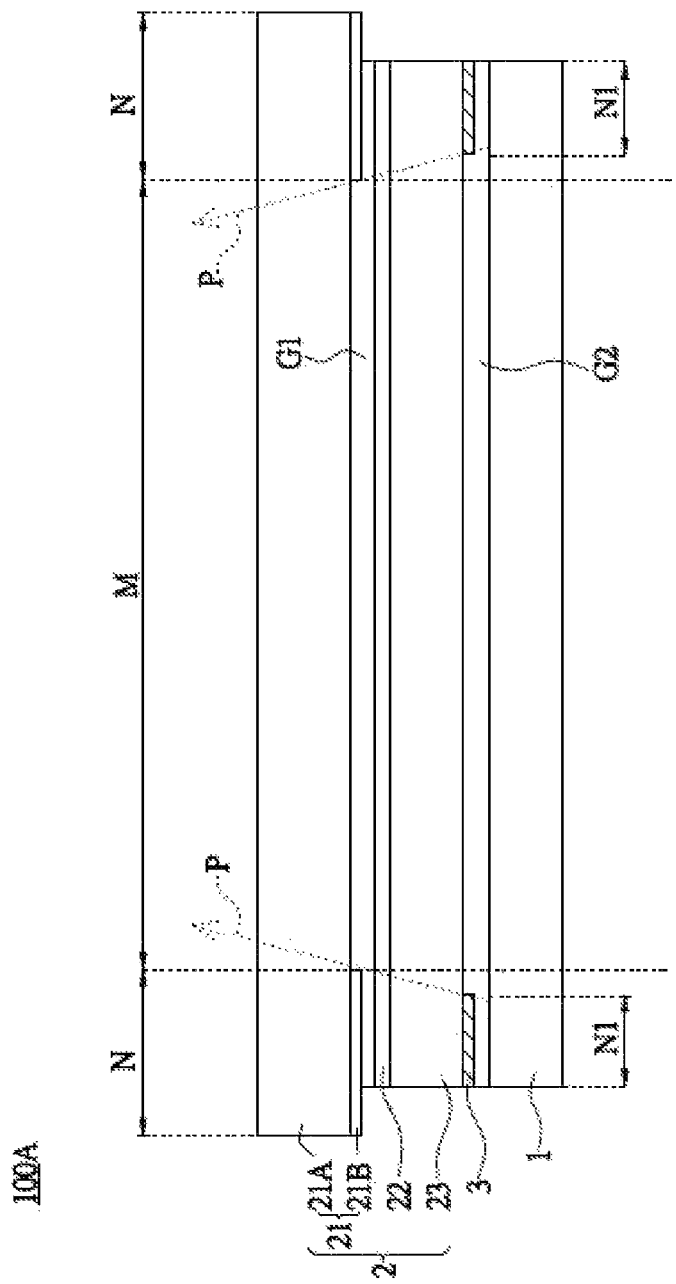
FIG. 4A is a cross-sectional view of the touch display device illustrating a first embodiment in accordance with the instant disclosure.

Please refer to FIG. 4A as a cross-sectional view of the touch display device illustrating a first configuration of the instant embodiment in accordance with the instant disclosure. As shown in FIG. 4A, the touch display device 100a further includes a carrier substrate 23 where the touch sensing structure 22 is disposed on. The shielding component 3 is disposed on a surface of the carrier substrate 23 opposite from the touch sensing structure 22.

A first optical adhesive layer G1 is disposed between the carrier substrate 23 and the cover 21A, whereas a second optical adhesive layer G2 is disposed between the carrier substrate 23 and the display module 1. In the instant embodiment, the touch sensing structure 22 is disposed between the carrier substrate 23 and the first optical adhesive layer G1, and the shielding component 3 is accordingly disposed between the carrier substrate 23 and the second optical adhesive layer G2. Understandably, the touch sensing structure 22 can also be disposed between the carrier substrate 23 and the second optical adhesive layer G2, and the shielding component 3 is disposed between the carrier substrate 23 and the first optical adhesive layer G1.

Figure 4B:
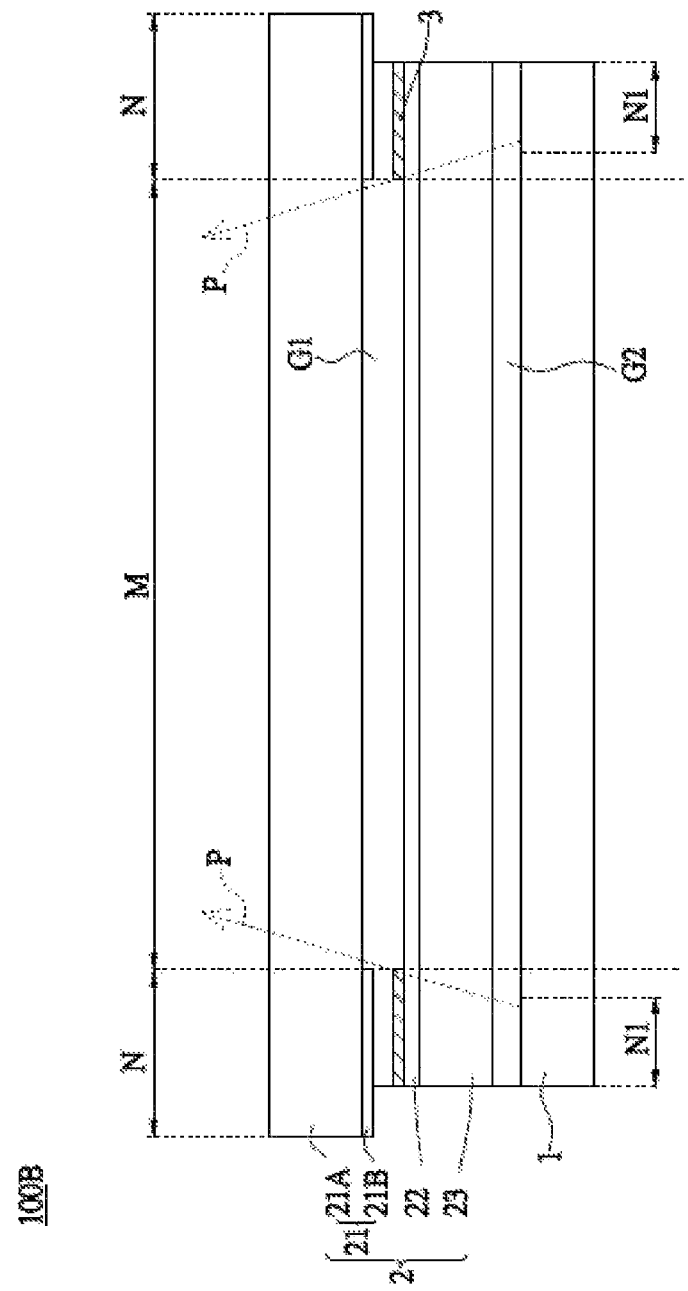
FIG. 4B is a cross-sectional view of the touch display device illustrating a second embodiment in accordance with the instant disclosure.

FIG. 4B is a cross-sectional view of the touch display device illustrating a second configuration of the instant embodiment in accordance with the instant disclosure. As shown in FIG. 4B, the instant embodiment differs from the previous embodiment in the touch display device 100B. Specifically, the shielding component 3 and the touch sensing structure 22 are disposed on the same surface of the carrier substrate 23. More specifically, in the instant embodiment, the shielding component 3 is disposed on the touch sensing structure 22, and disposed between the touch sensing structure 22 and the first optical adhesive layer G1. In another embodiment, the shielding component 3 can be disposed on the touch sensing structure 22 and disposed between the touch sensing structure 22 and the second optical adhesive layer G2. Understandably, the shielding component 3 can also be disposed on the carrier substrate 23 and disposed between the touch sensing structure 22 and the carrier substrate 23.

Figure 5A:
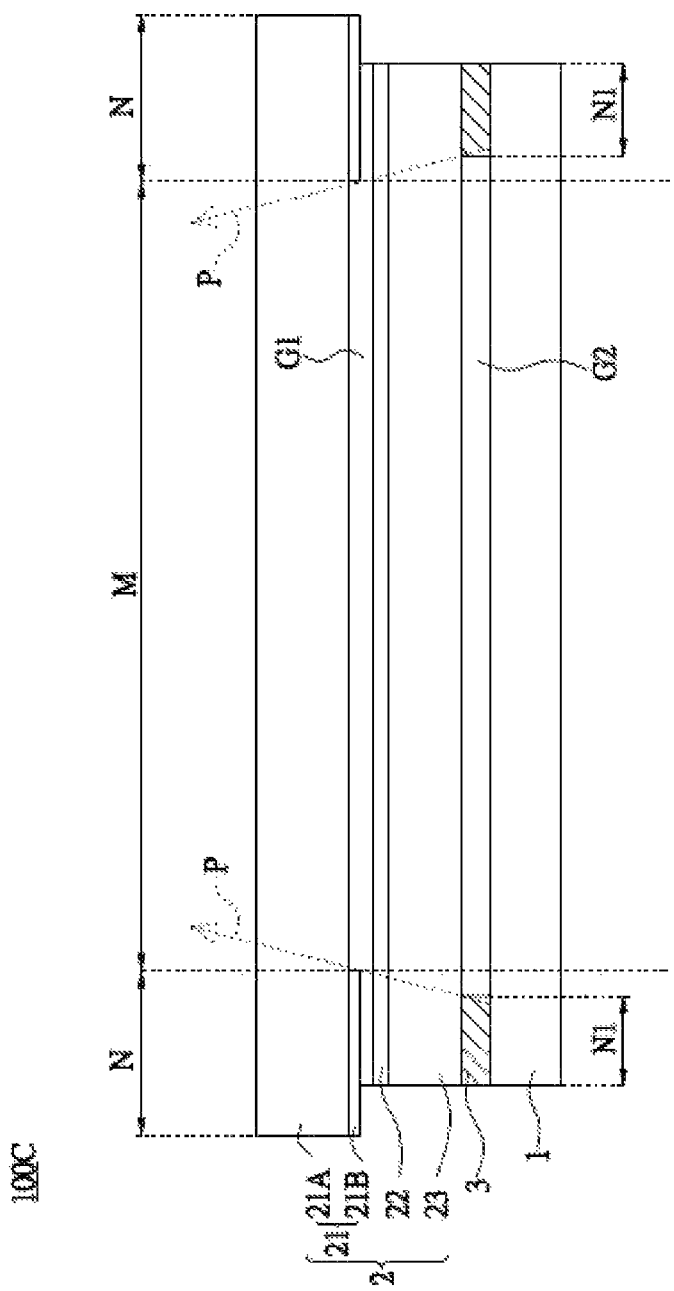
FIG. 5A is a cross-sectional view of the touch display device illustrating a third embodiment in accordance with the instant disclosure.

FIG. 5A is a cross-sectional view of the touch display device illustrating a third configuration of the instant embodiment in accordance with the instant disclosure. As shown in FIG. 5A, the instant embodiment differs from the previous embodiment in that the shielding component 3 of the touch display device 100C is an adhesive material which is in contact with the display module 1 and the carrier substrate 23. More specifically, the second optical adhesive layer G2 has a certain extent of interior shrinkage such that a gap emerges between the display module 1 and the carrier substrate 23 in the light leakage area N1 or the non-display area N. The shielding component 3 can fill in the gap such that the display module 1 and the carrier substrate 23 are laminated together via the shielding component 3. In the instant embodiment, the shielding component 3 not only shields the leaked light but also provides adhesive properties. Understandably, in one embodiment, the shielding component 3 and the second optical adhesive layer G2 can be an integrally formed structure.

Figure 5B:
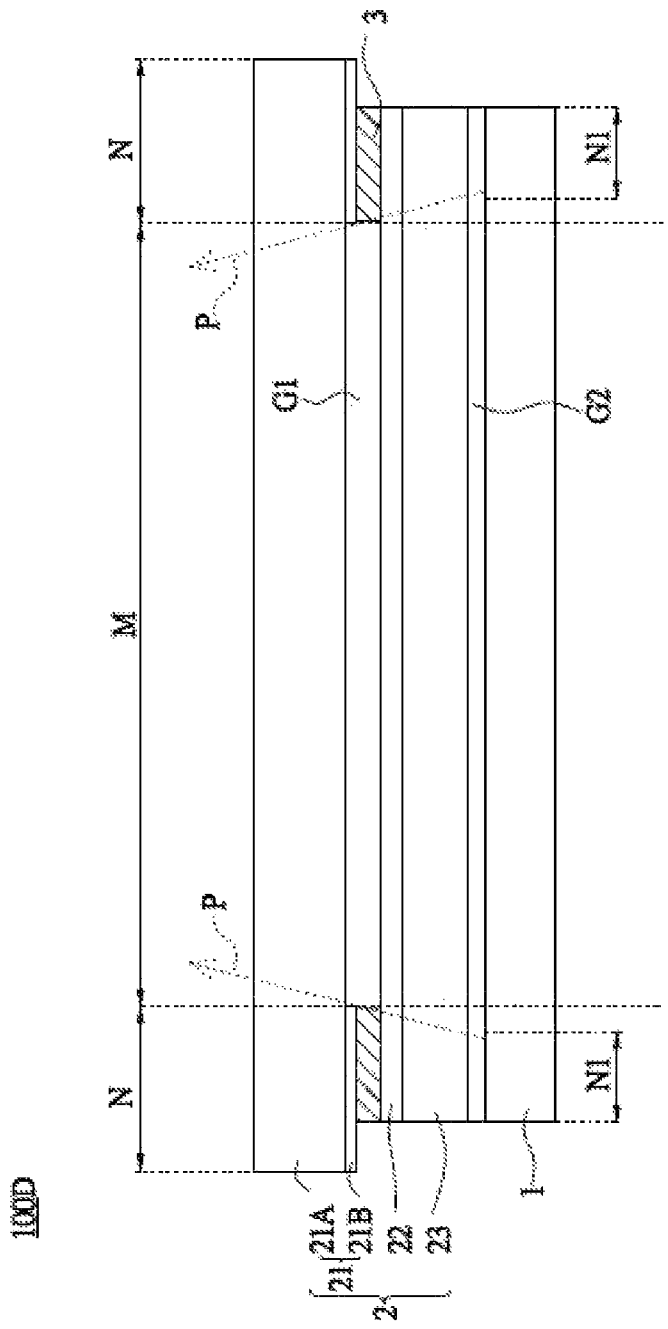
FIG. 5B is a cross-sectional view of the touch display device illustrating a fourth embodiment in accordance with the instant disclosure.

Please further refers to FIG. 5B as a cross-sectional view of the touch display device illustrating a fourth configuration of the instant embodiment in accordance with the instant disclosure. As shown in FIG. 5B, the shielding component 3 of the touch display device 100C in the instant embodiment is also an adhesive material, which is disposed between the decorative layer 21B and the touch sensing structure 22. Furthermore, the shielding component 3 is in contact with the decorative layer 21B and the touch sensing structure 22. More specifically, the first optical adhesive layer G1 has a certain extent of interior shrinkage such that a gap emerges between the decorative layer 21B and the touch sensing structure 22 in the light leakage area N1 or the non-display area N. The shielding component 3 can fill in the gap such that the decorative layer 21B and the touch sensing structure 22 are connected via the shielding component 3. In the instant embodiment, the shielding component 3 not only shields the leaked light, but also has adhesion. Understandably, in one embodiment, the shielding component 3 and the first optical adhesive layer G1 can be an integrally formed structure. The touch display device 100D in the instant embodiment is substantially the same as the previous embodiment, and will not be further discussed.

Figure 6:
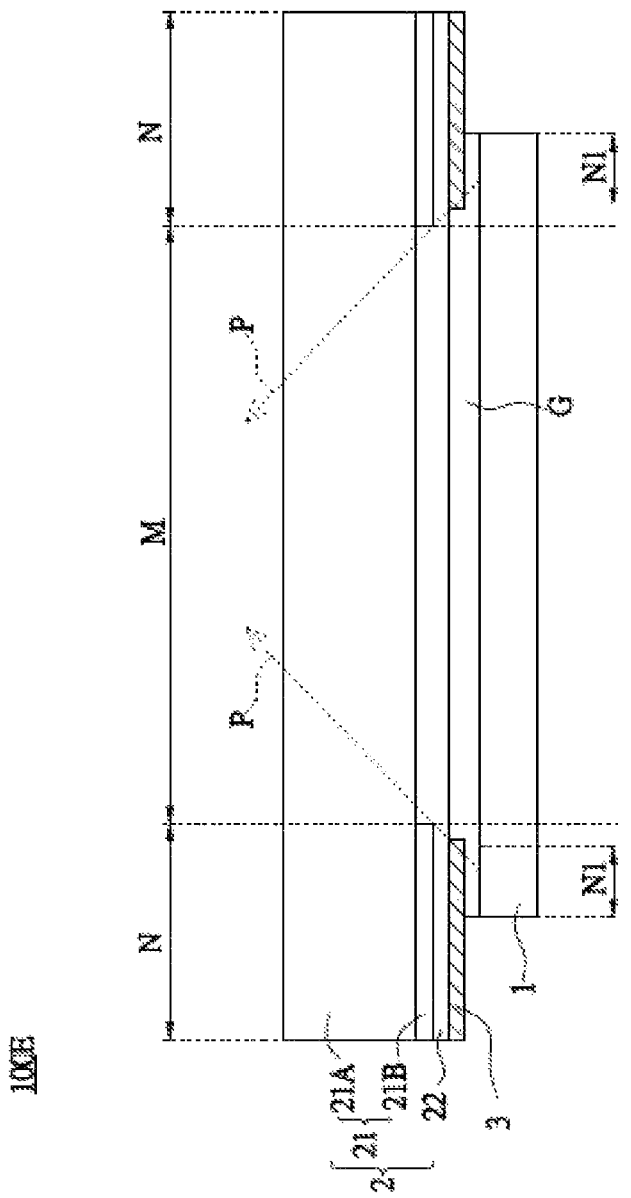
FIG. 6 is a cross-sectional view of the touch display device illustrating a fifth embodiment in accordance with the instant disclosure.

Please further refer to FIG. 6 as a cross-sectional view of the touch display device illustrating a fifth configuration of embodiment in accordance with the instant disclosure. As shown in FIG. 6, the touch sensing structure 22 of the touch display device 100 E in the instant embodiment is disposed on the cover 21A and extends from the display area M of the cover 21A onto the non-display area N of the decorative layer 21B. The shielding component 3 is disposed between the touch sensing structure 22 and an optical adhesive layer G.

The following further discloses the other components of the touch display device 1 as shown in FIGS. 4A to 6, and descriptions regarding the other components as shown in FIG. 2 will not be further discussed.

In the touch display device 1 as shown in FIGS. 4A to 5B, the carrier substrate 23 is a transparent material, which can be substantially the same material as chosen for the cover 21A, such as glass. However, the material can also be different from the cover 21A. For example, the cover 21A can be made of a glass material, whereas the carrier substrate 23 can be made of PET or similar types of flexible materials.

In the touch display device 1 as shown in FIGS. 4A to 6, the first optical adhesive layer G1, the second optical adhesive layer G2, and the optical adhesive layer G serve to bond two surfaces of components, which can be solid or liquid optical adhesives.

In the touch display device as shown in FIGS. 4A to 6, the shielding component 3 has a thickness smaller than 20 microns (μm) in order to ensure the engagement between the optical adhesive layers. The thickness of the shielding component 3 varies according to the thickness of the optical adhesive layers. The shielding component 3 is made of non-transparent materials such as opaque inks, which can be made by printing directly on the shielding component 3. In another embodiment, the shielding component 3 is made of opaque adhesive materials, which can be formed by robotic adhesive dispenser. In another embodiment, the shielding component 3 can be an opaque metallic material, which can be formed by sputter coating.

According to the embodiments of the instant disclosure, the aforementioned touch display device can prevent light leakage via the positioning of the shielding component.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A touch display device having a display area and a non-display area arranged adjacent to the display area, comprising:
    a display module having at least one light leakage area defined in the non-display area, at least one leaked light ray generated by the display module and diverging from the light leakage area;
    a touch panel module facing the display module and including:
        a cover structure comprising:
            a cover and a decorative layer, wherein the decorative layer is arranged at peripheral portions of the cover to define the non-display area; and
        a touch sensing structure disposed between the cover structure and the display module;
        a carrier substrate, wherein the touch sensing structure is disposed on the carrier substrate; and
    a shielding component disposed between the decorative layer and the display module, and arranged in the traveling path of at least one leaked light ray;
    wherein the shielding component is disposed on a surface of the carrier substrate, and the touch sensing structure is disposed on a different surface of the carrier substrate;
    wherein the shielding component provides adhesion, and the shielding component contacts the display module and the carrier substrate.

2. The touch display device as recited in claim 1, wherein the shielding component is disposed on the decorative layer or the display module.

3. The touch display device as recited in one of claim 1, wherein the shielding component has a thickness less than 20 μm.

* * * * *